(12) United States Patent
Zmuda

(10) Patent No.: US 6,777,581 B1
(45) Date of Patent: Aug. 17, 2004

(54) METHOD FOR TRANSFORMATION OF POLYOLEFINE WASTES INTO HYDROCARBONS AND A PLANT FOR PERFORMING THE METHOD

(75) Inventor: Henryk Zmuda, Kaatowice (PL)

(73) Assignee: Smuda Technologies, Inc., Roseville, CA (US)

( * ) Notice: Subject to any disclaimer, the term of this patent is extended or adjusted under 35 U.S.C. 154(b) by 0 days.

(21) Appl. No.: 09/958,875
(22) PCT Filed: Apr. 10, 2000
(86) PCT No.: PCT/PL00/00027
§ 371 (c)(1), (2), (4) Date: Oct. 17, 2001
(87) PCT Pub. No.: WO00/64998
PCT Pub. Date: Nov. 2, 2000

(30) Foreign Application Priority Data

Apr. 26, 1999 (PL) ................................................ 332762

(51) Int. Cl.$^7$ ................................................ C10G 1/10
(52) U.S. Cl. ........................... 585/241; 201/2.5; 201/25
(58) Field of Search ........................ 585/241; 201/2.5, 201/25

(56) References Cited

U.S. PATENT DOCUMENTS 4,707,351 A * 11/1987 Lord et al. ............... 423/648 R
6,255,547 B1 * 7/2001 Smuda ....................... 585/241
6,423,878 B2 * 7/2002 Reverso ...................... 585/241

FOREIGN PATENT DOCUMENTS

DE 196 41 743 A * 4/1998 ............. C08J/11/12

OTHER PUBLICATIONS

Database WPI Section Ch, Week 199405, Derwent Publications Ltd., London, GB; XP002052121 & JP 05 345894 A (Toyo Seikan Kaisha Ltd), Dec. 1993, abstract.*

* cited by examiner

Primary Examiner—Walter D. Griffin
(74) Attorney, Agent, or Firm—Stites & Harbison PLLC; B. Aaron Schulman, Esq.

(57) ABSTRACT

A subject of the invention is a method for transformation of polyolefin wastes into hydrocarbons and a plant for carrying thereof. According to the method, disintegrated polyolefin raw material is subjected in a reactor to the progressive heating to the temperature below 600° C. together with a catalyst chosen from a group comprising cements, heavy metal silicates and resinates and mixtures thereof, where a catalyst is used in an amount below 30% b.w., preferably in an amount of 5–10 % b.w., calculated on the weight of the polyolefin raw material. A plant for transformation of polyolefin wastes into hydrocarbons, comprises a reactor in a shape of a vertical tank provided with a heating system in a form of a combustion chamber (8) surrounding a tank from below and the chamber (8) is heated with at least one burner (9), supplied with reaction products, and in the combustion chamber, symmetrically distributed on a tank circumference, preferably in some rows, heating pipes (10) are located, which pass throughout inside of the tank above the level of an upper edge of a mixer (6) and which are led out through sieve membrane (7) to the combustion gases outlet chamber.

9 Claims, 2 Drawing Sheets

METHOD FOR TRANSFORMATION OF POLYOLEFINE WASTES INTO HYDROCARBONS AND A PLANT FOR PERFORMING THE METHOD

FIELD OF THE INVENTION

The subject of the invention is a catalytic method for transformation of polyolefine wastes into hydrocarbon products, e.g. gasoline, diesel oil and crude oil, and a plant for carrying thereof.

BACKGROUND OF THE INVENTION

A development of the production of polyolefines and their use in almost every line of life causes a consequent increase of related wastes, collected in the dumps, where they take big space relatively to their weight.

A chemical resistance of polyolefins makes them stable for hundreds of years, while they do not yield to destruction, being, a particularly burdensome contamination of the environment. A problem of mating polyolefin wastes productive is at present the matter of a special priority and is a very important element of a natural environment protection.

The hitherto used methods, such as combustion and gasification are generating more problems than they solve.

Till now they are the most expensive methods of utilisation of plastic wastes and all probes of making them less expensive result with an ecological catastrophe. The said situation causes, the countries taking care of ecology to not allow combustion of plastic wastes.

There are known some methods of a thermical decomposition of polyolefins to hydrocarbons in the range of temperatures between 650–850° C. Also there are disclosed the methods combining a high-temperature pyrolysis with consequent catalytic conversion of pyrolytic products to gasoline, diesel oil and crude oil. In the known methods catalysts were used in a form of zeolites, as it has been described in the patent U.S. Pat. No. 4,016,218. The most popular is the use of zeolite ZMS-5 hydrogen form, as known from the patent U.S. Pat. No. 3,702,886. The use of other zeolites, e.q. ZMS-11 (U.S. Pat. No. 3,709,979), ZMS-12 (U.S. Pat. No. 3,832,449), ZMS-23 (U.S. 4,076, 842), ZMS-35 (U.S. Pat. No. 4,016,245) and ZMS-48 (U.S. Pat. No. 4375573) is also disclosed. In known and used methods catalysts in a form of zeolites with metal atoms, e.g. platinum are applied also. The basic imperfection of zeolite-type catalysts is their sensitivity to hydrochloride, which causes destruction of a catalyst in concentrations above 200 ppm in a product. Considering the fact, plastic wastes always contain poly/vinyl chloride/, the application of expensive zeolite-type catalysts is economically disadvantegeous.

The American patent description No U.S. Pat. No. 4,584, 421 and European patent application NO. 0276081 A2 disclose a thermal decomposition of polyolefin and a catalytic process of products conversion using zeolites. However in that method also chlorine containing polymers have to be selected and separated, which operation makes the whole process unprofitable.

The German patent publication No. DE-A-196 41 743 relates to a method of converting polyolefin waste into hydrocarbons, where the polyolefin waste is treated at temperatures of 180–620° C., preferably 300–450° C. in the presence of a heavy metal silicate used as a catalyst in amount of up tp 30% by weight, based on the polyolefin waste.

The methods specified above enabled obtaining hydrocarbons with the yield of 60–94%, and the obtained hydrocarbons comprised mainly chains up to $C_{39}$. Besides the above, a product contained a big share of gaseous substances, which caused a frequent breaks of a process and forced cleaning of the reactor, disturbing and interrupting a continous operation between the maintenance overhauls. The reactors used in the known methods for carrying the reaction had usually a shape of typical chemical reactor in a form of a cylindrical tank, provided with a dosing system, heating system and a low-speed mixer, preventing deposition of the reaction mixture. An analysis of the information material concerning a prior act allowed a conclusion, that an ideal technological solution is a method of polyolefin decomposition at low temperatures in one-step process, carried in a liquid phase of molten polymer, while the used catalyst is hydrochloride—resistance and not expensive.

SUMMARY OF THE INVENTION

The above aim is reached in the method according to the invention, using cements as a catalyst. Moreover, it has been found, heavy metals resonates are resistant to hydrochlorine and are the ideal catalysts for breaking C-C bonds in polyolefine chains at low temperatures.

DETAILED DESCRIPTION OF THE PREFERRED EMBODIMENTS

Figure 1:
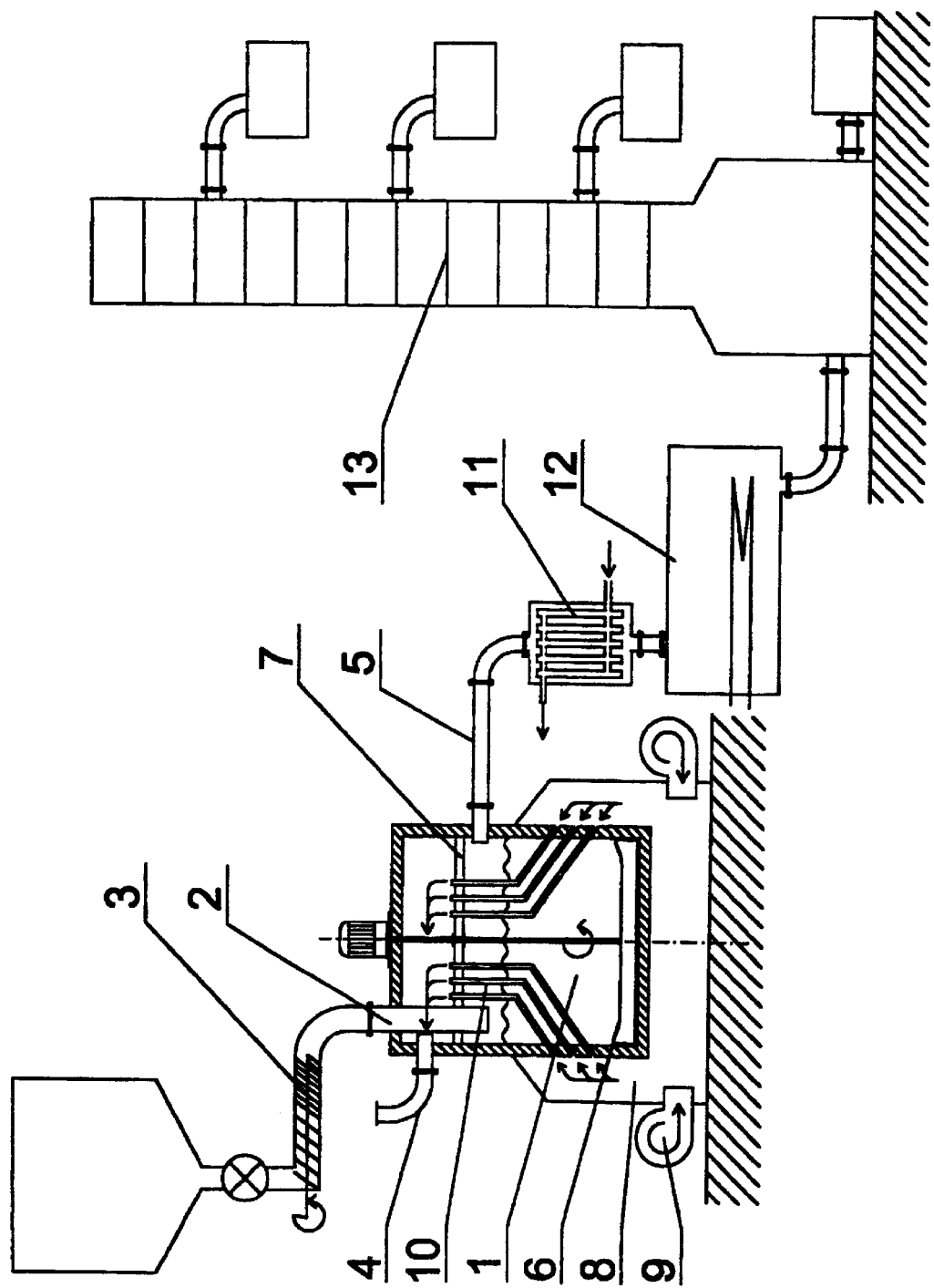
FIG. 1 is a schematic representation of a plant in accordance with the present invention.
Figure 2:
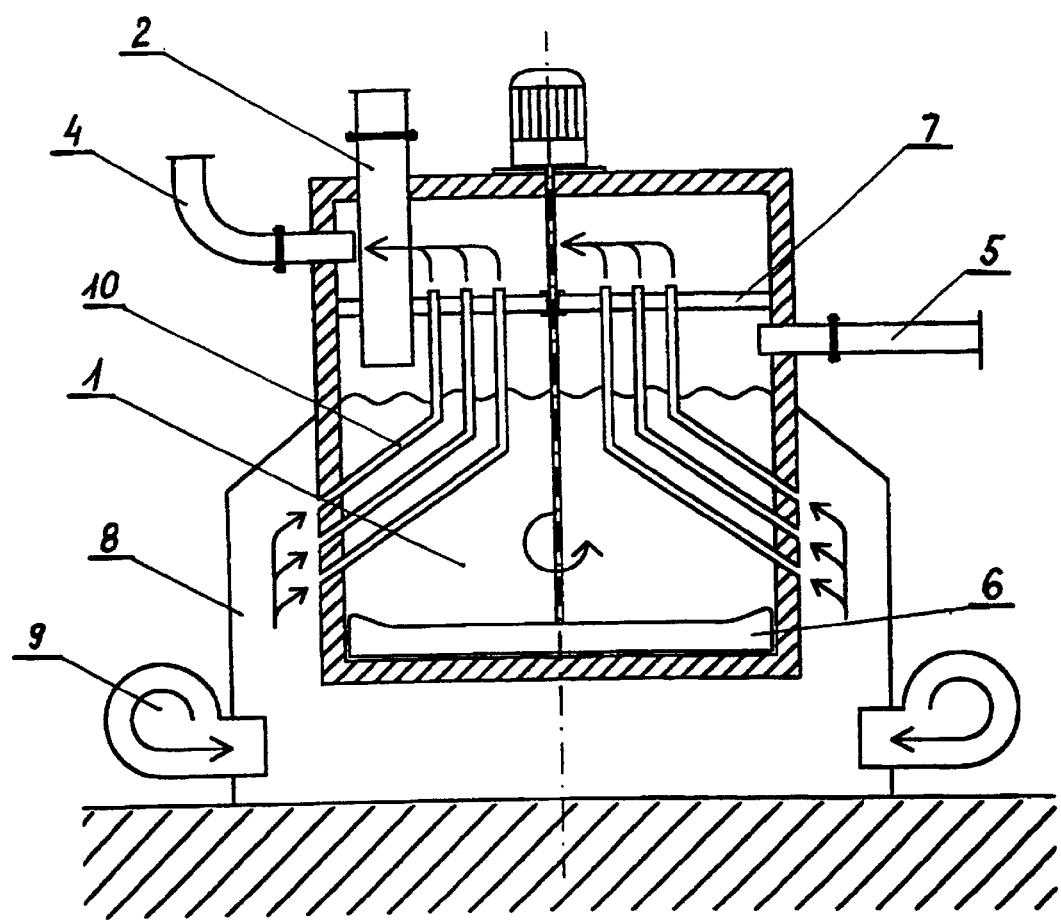
FIG. 2 is a schematic representation of the reactor of FIG. 1 in accordance with the present invention.

In a method according to the invention the disintegrated polyolefine raw material is subjected in a reactor to the progressive heating to the temperature below 600° C. together with a catalyst chosen from a group comprising cements, heavy metal resinates combinations thereof with heavy metal silicates, where a catalyst is used in amount below 30% b.w., preferably in amount of 5–10% b.w., calculating on a weight of the polyolefine raw material. The reaction has a particularly preferable course at the temperatures in the range between 300–450° C. Preferably, chromium $Cr^{3+}$, iron $Fe^{3+}$, nickel $Ni^{2+}$, cobalt $Co^{2+}$, manganese $Mn^{2+}$, cadmium $Cd^{2+}$, copper $Cu^{2+}$, zinc $Zn^{2+}$ and $Pb^{2+}$ silicates are used as the admixture to the said cement and/or heavy metal resinates. A catalyst can contain a mixture of two or more heavy metal silicates and/or resinates.

Preferably, if the catalyst is deposited on aluminium oxide $Al_2O_3$ carrier. The method can be carried out in a periodical or continous process.

Using a method according to the invention, LD and HD polyethylene, polypropylene, polyisobutylene, polistyrene and a natural and synthetic caotchouc can be transformed.

A process of the transformation of polyolefin wastes to liquid hydrocarbons is carried out in a plant according to the invention, comprising at least one reactor in a shape of vertical tank, provided with an inlet charging hole, connected to a polyolefine raw material and catalyst dosing device, combustion gases outlet pipe, product receiving pipe, mixer and sieve membrane and a heating system in a form of a combustion camber surrounding a tank from below and the said chamber is heated with at least one burner, supplied with reaction products, and in the combustion chamber, symetrically distributed on a tank circumference, preferably in some rows, heating pipes are located, which pass throughout inside of the tank above the level of an upper wedge of a mixer and which are led out through sieve membrane to the combustion gases outlet chamber. The plant comprises also a condenser for a product condensation, a raw product buffer tank and a distillation column. Products of the reaction coming out from the reactor through an outlet pipe are cooled and condensed and then are directed to a buffer tank, heated up to 40° C.

The preferable regulation of a process is achieved, when a buffer tank is provided with a level sensor, included into a raw material dosing device automatic regulation system, ensuring keeping a level of a reactor content at the same range.

From a buffer tank a product is directed to a distillation column, where fractions of various boiling temperatures are separated.

The introduction of heating pipes above the mixer enables more efficient mixing, especially of a bottom zone, an uniform distribution of a catalyst in a reaction mass and remarkably decreases formation of agglomerates and coke.

A plant according to the invention is presented on the enclosed drawings in a form of an exemplary embodiment of the invention.

A plant comprises one reactor 1 according to the invention, in a shape of vertical tank, provided with an inlet charging hole 2, connected to a polyolefin raw material and catalyst dosing device 3, combustion gases outlet pipe 4, product receiving pipe 5, mixer 6 and a sieve membrane 7 and a heating system in a form of a combustion chamber 8 surrounding a tank 1 from below and the said combustion chamber 8 is heated with at least one burner 9 supplied with reaction products, and in the combustion chamber 8, symetrically distributed on a reactor tank circumference, preferably in some rows, heating pipes 10 are located, which pass throughout inside of the tank above the level of an upper wedge of a mixer 6 and which are led out through a sieve membrane 7 to the combustion gases outlet chamber. The plant comprises also a condenser 11 for a product condensation, a raw product buffer tank 12 and a distillation column 13.

The reaction products, coming out from the reactor through a product receiving pipe, are directed to a condenser 11 wherein they are cooled and condensed and then directed to the buffer tank 12, which is heated to 40° C. A buffer tank 12 is provided with a level sensor, included into a raw material dosing device 3 automatic regulation system, ensuring keeping a level of a reactor 1 content at the same range, which is for achieving the preferable regulation of a process.

From the buffer tank 12 raw product is directed to the distillation column 13, where fractions of different boiling temperatures are separated. A method according to the invention enabled a utilisation of polyolefine wastes, being especially stable contamination of environment, and forming of a fully valuable, ecological product, which is a raw material for the production of desired hydrocarbon materials.

In a result low molecular hydrocarbons of $C_4$ to $C_{20}$ of a high isomerization degree are produced.

Relating to petrochemical products a product obtained in a method according to the invention does not contain any amount of sulphur or heavy metals. This product can be a raw material for the production of gasolines, diesel oil and ecological crude oil.

EXAMPLE 1

In the reactor according to the invention, provided with a mixer 6, worm dosing unit 3, outlet pipe 5 for receiving a distillation product, connected to a water cooler 11, 180 kg of agglomerated polyethylene and polypropylene (1:1) foil wastes were placed. 15 kgs of white Portland cement were added into the reactor and a content was heated up to melting. After a content got plastic a mixer was put on and it was heated up to 350° C. and then kept in that temperature till a moment, the formation of a product was stopped. After a condensation of all the product in a buffer tank 179 kgs of a viscous oil were obtained, which properties are shown in Table 1a and 1b.

TABLE 1a

Physical properties of a product

| Property | Value |
|---|---|
| Density [g/cm$^3$] | 0.786 |
| Ignition temperature [° C.] | 20 |
| Viscosity at 80° C. [mm$^2$/s] | 1.51 |
| Calorific value [kJ/kg] | 42.120 |

TABLE 1b

Elementary analysis of a product

| Component | Content (%) |
|---|---|
| carbon | 85.51 |
| hydrogen | 14.13 |
| sulphur | none |
| nitrogen | traces |
| chlorine | none |
| metals | traces |

EXAMPLE 2

To the reactor 1 provided with a mixer 6, a worm dosing unit 3 and an outlet pipe 5 for receiving a distillation product 15 kgs of a Portland cement and 150 kgs of polyolefine wastes in a form of cut milk product containers, canisters and motor-oil bottles were added. A content of the reactor 1 was heated up till melted and then a mixer was operated. The reaction mixture was heated up to 390° C. and kept in this temperature, still stirring. A product distilling from a reaction mixture was condensed in a condenser 11 /water cooler/. As a product 148 kgs of a yellowish-brown mass were obtained, which soldified after some time. The resulted mass was subjected to a distillation, which course is given in Table 2.

TABLE 2

A course of distillation of the raw product

| fraction volume (% b.v.) | start | 5 | 7.5 | 10 | 20 | 30 | 40 | 50 | 60 | 70 | 80 | 90 |
|---|---|---|---|---|---|---|---|---|---|---|---|---|
| temperature (° C.) | 48 | 77 | 100 | 115 | 153 | 186 | 224 | 265 | 325 | 365 | 372 | 375 |

EXAMPLE 3

The reactor 1 was heated very slowly till a content was melted. After adding of 5% chromium silicate a mixer 6 was operated and a temperature was slowly increased up to 390° C. As a reaction mixture decreased broken polyolefin were dosed into a reactor. The time a raw material dosing device 3 was regulated by the level of a raw product in a buffer tank. During the reaction course the amount of a reaction mixture was kept in the range of 75–80% of a reactor working volume. After cooling and condensing of a product a hydrocarbon mixture was obtained. Below results of a real boiling temperatures are presented, as determined in Podbielniak apparatus, type Hyper Col series 3800 according to ASTM D 2892.

| | |
|---|---|
| to 170° C. | 40.1% b.v. (gasoline) |
| from 170° C. to 300° C. | 30.2% b.v. (Diesel oil N1) |
| from 300° C. to 350° C. | 10.1% b.v. (Diesel oil N2) |
| above 350° C. | 15.9% b.v. |
| loss by distillation | 3% b.v. |

A summarized fuel fractions content in a product is 81.1% and it is higher than a content of such fractions in natural petroleum oil.

EXAMPLE 4

To the reactor 1 provided with a mixer 6, distillate receiving pipe 5 and a heating system 150 kgs of cut polyethylene wastes and 10 kgs of cobalt resinate were added. A content was heated till melted and then a mixer 6 was operated. Still mixing a content of the reactor 1 was lead up to 400° C. and a product distilled. A course of the distillation is presented in Table 4.

TABLE 4

A course of distillation of the raw product

| fraction volume (% b.v.) | start | 5 | 10 | 20 | 30 | 40 | 50 | 60 | 70 | 80 | 90 |
|---|---|---|---|---|---|---|---|---|---|---|---|
| temperature (° C.) | 51 | 72 | 112 | 145 | 172 | 220 | 251 | 354 | 368 | 376 | 382 |

EXAMPLE 5

In a reactor 1 provided with a heating-cooling system, a mixer 6 and an outlet pipe 5 150 kgs of cut polyolefine wastes with 2 kgs of manganese resinate deposited on aluminium oxide, were added. After a temperature of 200° C. was reached and a content was melted, a mixer was operated and a reaction mass was gently heated up to 380° C., distilling a product. A course of the distillation is presented on Table 5.

TABLE 5

A course of distillation of the raw product

| fraction volume (% b.v.) | start | 5 | 10 | 20 | 30 | 40 | 50 | 60 | 70 | 80 | 90 |
|---|---|---|---|---|---|---|---|---|---|---|---|
| temperature (° C.) | 45 | 70 | 85 | 115 | 140 | 185 | 195 | 220 | 255 | 285 | 320 |

TABLE 6

Physico-chemical properties of a gasoline-corresponding fraction of catalytic degradation product, resulted in a method according to the invention

| Properties | Value ° C. | Method of determination |
|---|---|---|
| Course of distillation | | PN-81/C-04012 |
| beginning | 48 | |
| 5% distilled to | 73 | |
| 10% distilled to | 83 | |
| 20% distilled to | 96 | |
| 30% distilled to | 110 | |
| 40% distilled to | 120 | |
| 50% distilled to | 126 | |
| 60% distilled to | 130 | |
| 70% distiiled to | 133 | |
| 80% distilled to | 137 | |
| 90% distilled to | 143 | |
| 95% distilled to | 151 | |
| distillation finish | 155 | |
| Density at 20° C. [g/cm$^3$] | 0.73 | PN-90/C-0404 |
| Vapour pressure [kPa] | 29 | PN-84/C-4404 |
| Induction period [min] | 40 | PN-57/C-04040, method A |
| Sulphur content [%] | none | PN-88/C-04005 |
| Water content [%] | — | PN-81/C-04959 |
| Octane number value | 88 | PN-82/C-0412 |
| Aqueous extract reaction | neutral | PN-84/C-04064, method B |
| Element content | traces of Ca, V, Fe, Ni | Rtg |

TABLE 7

Physico-chemical properties of a Diesel oil-corresponding fraction of catalytic degradation product, resulted in a method according to the invention

| Properties | Value [° C.] N1 | Value [° C.] N2 | Method of determination |
|---|---|---|---|
| Course of distillation |  |  | PN-81/C-04012 |
| beginning | 190 | 292 |  |
| 5% distilled to | 200 | 305 |  |
| 10% distilled to | 203 | 307 |  |
| 20% distilled to | 210 | 308 |  |
| 30% distilled to | 214 | 309 |  |
| 40% distilled to | 220 | 310 |  |
| 50% distilled to | 227 | 311 |  |
| 60% distilled to | 235 | 313 |  |
| 70% distilled to | 243 | 315 |  |
| 80% distilled to | 251 | 317 |  |
| 90% distilled to | 262 | 322 |  |
| 95% distilled to | 270 | 327 |  |
| distillation finish | 273 | 333 |  |
| Density at 20° C. [g/cm$^3$] | 0.789 | 0.813 | PN-90/C-0404 |
| Kinematic viscosity at 40° C. [mm$^2$/s] | 1.7 | 5.0 | PN-81/C0411 |
| Cloud point [° C.] | (−) 45 | (−) 2 | PN-76/C-04115 |
| Flash point/closed crucible/[° C.] | 69 | 150 | PN-75/C-04009 |
| Sulphur content [%] | — | — | PN-88/C-04005 |
| PCB content [ppm] | — | — | ITN 3794 method |
| WWA content [ppm] | — | — | ITN 4693 method |
| Cetane factor | 66.5 | 84.0 | PN-85/C-040093 |
| Corrosion | 1a | 1a | PN-85/C-040093, method B |

TABLE 8

Physico-chemical properties of a residue remained after distillation of fuel fractions from a catalytic degradation product, resulted in a method according to the invention

| Properties | Value [° C.] | Method of determination |
|---|---|---|
| temperature >350° C. |  |  |
| Density at 20° C. [g/cm$^3$] | 0.851 | PN-90/C-0404 |
| Kinematic viscosity at 60° C. [mm$^2$/s] | 5.6 | PN-81/C-0411 |
| Flash point/opened crucible/ [° C.] | 224 | PN-75/C-04009 |
| Flow temperature [° C.] | 46 | PN-83/C-04117 |
| Residue after incineration [%] | 0.06 | PN-82/C-04077 |
| Paraffin content [%] | 37.4 | PN-91/C-04109 |
| Sulphur content [%] | 0.001 | PN-88/C-04005 |
| PCB content [ppm] | — | ITN 3794 method |
| WWA content [ppm] | 0.03 | ITN 4693 method |
| benzo-α-pyrene content [ppb] | 10 | ITN 2698 method |
| Element content | Fe, Zn, Ti, Ni traces | Rtg |
| Net calorific value kJ/kg | 43500 | PN-86/C-04062 |

What is claimed is:

1. A method for transformation of polyolefin wastes into hydrocarbons, wherein a broken raw polyolefin material is subjected to a progressive heating with a catalyst in a closed reactor, and a product, after condensation is subjected to a distillation, characterized in, that the disintegrated polyolefin raw material is subjected in a reactor to the progressive heating to the temperature below 600° C. together with a catalyst chosen from a group comprising cements heavy metal resinates and mixtures thereof, preferably with the admixture of heavy metal silicates, where a catalyst is used in amount below 30% b.w., preferably in amount of 5–10% b.w., calculating on a weight of the polyolefin raw material.

2. A method according to claim 1, characterized in, that a reaction is carried in a range of temperatures between 300–450° C.

3. A method according to claim 1, characterized in, that a catalyst is used in amount of 5–10% b.w., calculating on a weight of the polyolefin raw material.

4. A method according to claim 1, characterized in, that at least one catalyst is selected from a group of chromium $Cr^{3+}$ resinate, iron $Fe^{3+}$ resinate, nickel $Ni^{2+}$ resinate, cobalt $Co^{2+}$ resinate, manganese $Mn^{2+}$ resinate, cadmium $Cd^{2+}$ resinate, copper $Cu^{2+}$ resinate, zinc $Zn^{2+}$ resinate and lead $Pb^{2+}$ resinate.

5. A method according to claim 1, characterized in, that as the admixture at least one compound selected from a group of chromium $Cr^{3+}$ silicate, iron $Fe^{3+}$ silicate, nickel $Ni^{2+}$ silicate, cobalt $Co^{2+}$ silicate, manganese $Mn^{2+}$ silicate, cadmium $Cd^{2+}$ silicate, copper $Cu^{2+}$ silicate and zinc $Zn^{2+}$ silicate is used.

6. A method according to claim 1, characterized in, that a catalyst comprises white cements, portland cements, puzzolanic cement or a mixture of at least two said substances.

7. A method according to claim 1, characterized in, that as a catalyst a mixture containing white cement and chromium $Cr^{3+}$ resinate, preferably with admixture of $Cr^{3+}$ silicate, in amount of up to 20% b.w. calculating to the mass of a cement is used.

8. A method according to claim 1, characterized in, that a catalyst is deposited on aluminium oxide $Al_2O_3$.

9. A method according to claim 1, characterized in, that the process can be run in a periodic or continuous way.

* * * * *